United States Patent [19]

Greenwald

[11] 3,916,178

[45] Oct. 28, 1975

[54] APPARATUS AND METHOD FOR TWO CONTROLLER DIAGNOSTIC AND VERIFICATION PROCEDURES IN A DATA PROCESSING UNIT

[75] Inventor: Donald James Greenwald, Phoenix, Ariz.

[73] Assignee: Honeywell Information Systems Inc., Waltham, Mass.

[22] Filed: Dec. 10, 1973

[21] Appl. No.: 423,647

[52] U.S. Cl. ........................ 235/153 AK; 340/172.5
[51] Int. Cl.$^2$ .......................................... G06F 11/04
[58] Field of Search ............... 235/153 AK, 153 AE; 340/146.1 BE, 172.5

[56] References Cited

UNITED STATES PATENTS

| | | | |
|---|---|---|---|
| 3,519,808 | 7/1970 | Lawder | 235/153 AK |
| 3,692,989 | 9/1972 | Kandiew | 235/153 AK |
| 3,794,973 | 2/1974 | Huber et al. | 235/153 AK |

OTHER PUBLICATIONS

Chao, The System Organization of MOBIDIC B, 1959, Proc. of the Eastern Joint Computer Conf., pp. 101–107.

*Primary Examiner*—Charles E. Atkinson
*Attorney, Agent, or Firm*—David A. Frank; Ronald T. Reiling

[57] ABSTRACT

Apparatus for two controller execution of verification and diagnostic procedures in a data processing unit. The CPU and IOC subsytems of the data processing unit each contain control apparatus which can be used to manipulate the apparatus of the associated subsystem as well as the apparatus of the non-associated subsystems. The control apparatus of each subsystem has access to error-detection circuitry and a plurality of registers in both subsystems so as to have available the results of apparatus manipulation. The detection of a fault condition in one subsystem can be analyzed by the second subsystem without ambiguity caused by the fault condition itself. The control apparatus of both subsystems can cooperate to test interacting portions of the subsystems.

9 Claims, 8 Drawing Figures

APPARATUS AND METHOD FOR TWO CONTROLLER DIAGNOSTIC AND VERIFICATION PROCEDURES IN A DATA PROCESSING UNIT

RELATED APPLICATION

"Apparatus And Method For Two Controller Fault-Condition Localization In A Data Processing Unit," having U.S. Ser. No. 423,648, also filed on Dec. 10, 1973, and having the same inventor and assignee as named herein.

BACKGROUND OF THE INVENTION

1. Field of the Invention

This invention relates generally to data processing units and more particularly to apparatus for the verification of the operation and the diagnosis of fault conditions in data processing units.

2. Description of the Prior Art

As the complexity of the modern data processing unit has increased, the problem of verification of the operation and diagnosis of a fault condition have become more difficult. Not only have the possibilities for malfunction increased, but the complexity of the apparatus obscures the origin of detected fault conditions.

Two approaches have been attempted in the past. According to one approach, redundancy is built into the data processing unit so that a correct result is available even in the presence of a malfunction. Not only does this method increase the complexity of the data processing unit, the cost of the additional apparatus becomes prohibitive.

A second approach to the identification of fault conditions have been to employ error condition detection apparatus. In this approach, for example, at least one parity check signal is included with information containing data signals. The parity is calculated at various times during the processing of the data and the calculated parity signal is compared with the parity check signal. When the two signals do not agree, an error condition has been detected. However, with the increased complexity of the modern data processing unit, the amount of error condition checking apparatus becomes prohibitive, especially if an attempt is made to localize the error. An error can otherwise go undetected and propagate through the data processing unit, being detected at a point remote from the fault condition producing the error.

More recently, the control apparatus of the data processing unit has been employed in self-diagnosis of machine malfunction. However, the presence of the fault condition itself limits the utility of the approach in the localization of the error condition, the fault condition rendering the localization process unreliable.

As a partial solution to the problems encountered in machine self-verification, it has been suggested to utilize a building-block approach. The object of this approach is to establish a known portion of the system as properly operating and then to use this part of the system to check additional parts whose status is unknown. Certain elements of a processor verify themselves in a limited manner. Following the successful completion of this limited test, the already-tested parts are then used in testing other parts of the system. In this manner, except for the first limited testing operation, the components of a system are tested by parts which have previously been verified. The philosophy of this approach is to "start small" and is described in the AFIPS Conference Proceedings, Volume 36, 1970 Spring Joint Computer Conference, "System/360 Model 85 Microdiagnostics" by Neil Bartow and Robert McGuire, Pages 191 to 197*a*.

The advantages of using microdiagnostics in self-verification procedures have also been fully developed in the prior art. (See again Bartow and McGuire). A specialized microdiagnostic program may be loaded into a writable control storage unit via an I/O device such as a tape unit. The actual microdiagnostic routine executed by the system can vary depending on the particular system, its environment and the malfunction. A useful method in any of these cases is described in a paper entitled "An Integrated Approach To Automated Computer Maintenance" by F. J. Hackl and R. W. Shirk, IEEE Conference Record of the Sixth Annual Symposium on Switching Circuit Theory and Logical Design, held at the University of Michigan, Ann Arbor, Michigan, October 6–8, 1965. Specifics for implementing this method are disclosed in U.S. Pat. No. 3,325,788, issued June 13, 1967 and U.S. Pat. No. 3,343,141, issued Sept. 19, 1967, both invented by F. J. Hackl.

As the complexity of the data processing unit has increased, more control functions formerly carried out by the Central Processing Unit, are being delegated to Input/Output Controller. Consequently, a second set of control apparatus has been added to the IOC to carry out these control functions. These control centers can provide the means for controlling the manipulation of either of the subsystems of the data processing unit and analyzing the results of this manipulation. It is the purpose of the present invention to provide the two centers of control in the diagnostic and verification procedures eliminating ambiguity arising from fault conditions during self-verification.

It is therefore an object of the present invention to provide an improved data processing unit.

It is a further object of the present invention to provide for improved diagnostic and verification apparatus in a data processing unit.

It is still a further object of the present invention to provide two subsystems with associated control apparatus for improved diagnostic and verification procedures in a data processing unit.

It is a more particular object of the present invention to provide a data processing unit with two subsystems, each subsystem including control apparatus, error condition detection apparatus, apparatus permitting the control apparatus of one subsystem to manipulate the other subsystem, and apparatus for permitting each control apparatus access to a plurality of registers in each subsystem, for use in diagnostic and verification procedures.

It is another object of the present invention to provide a data processing unit two subsystems, each subsystem capable of manipulating the other subsystem and analyzing the results of that manipulation, wherein a subsystem containing a fault condition may be tested by a subsystem without a fault condition.

It is still another object of the present invention to provide apparatus in each of two subsystems for controlling the manipulation of the other subsystems.

It is a more particular object of the present invention to provide apparatus in each of two subsystems of a data processing unit for issuing a group of signals, the signals being applied to a subcommand generator of the other subsystem, signals from the subcommand generator controlling the activity of the other subsystem.

It is another particular object of the present invention to provide access to a plurality of registers in each of two subsystems to the control apparatus of each subsystem.

SUMMARY OF THE INVENTION

The aforementioned and other objects of the present invention are accomplished in a data processing unit having two subsystems, by control apparatus associated with each subsystem and having access to a plurality of registers in each subsystem, each control apparatus capable of manipulating the apparatus of either subsystem. In addition, each subsystem includes error condition detection apparatus, the results of which are available to both sets of control apparatus.

The control apparatus of an error-free subsystem can be used to manipulate the apparatus of the second subsystem. The results of a given manipulation, determined by extraction of appropriate register contents and by examination of the error condition detection apparatus, can be utilized to localize a malfunction. The testing of one subsystem by a fault-free subsystem removes ambiguity caused by the presence of the fault condition during self-verification.

These and other features of the invention will be understood upon reading of the following description along with the drawings.

DESCRIPTION OF THE PREFERRED EMBODIMENT

Detailed Description of the Figures

Figure 1:
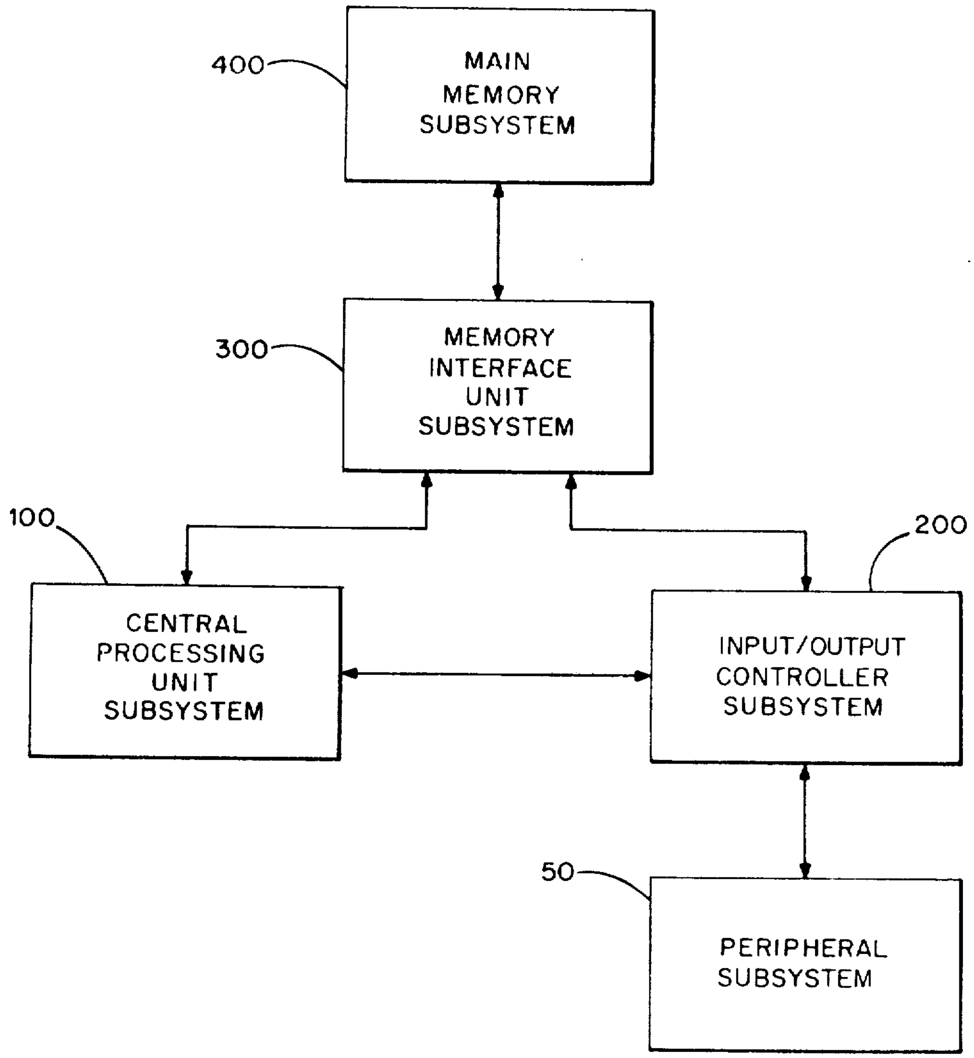
FIG. 1 is a block diagram of the principal subsystems of a data processing unit.

Referring now to FIG. 1, a block diagram of the principal subsystems of a data processing unit is shown. The Peripheral Subsystem 50 consists of peripheral units (such as printers, magnetic tape units, etc.) which supply data to or receive data from the remainder of the data processing unit. The Input/Output Controller Subsystem (IOC) 200 controls the transfer of data from the component peripheral units of Peripheral Subsystem 50 to the data processing unit. The Main Memory Subsystem (MMS) 400 provides the apparatus for storage of data currently required for the operation of the data processing unit. The Central Processing Unit Subsystem (CPU) 100 contains the apparatus for implementing the major control and manipulative functions of the data processing unit. The Memory Interface Unit Subsystem (MIU) 300 provides the apparatus for controlling the transfer of data between the MMS 400 and the CPU 100 or IOC 200.

Figure 2:
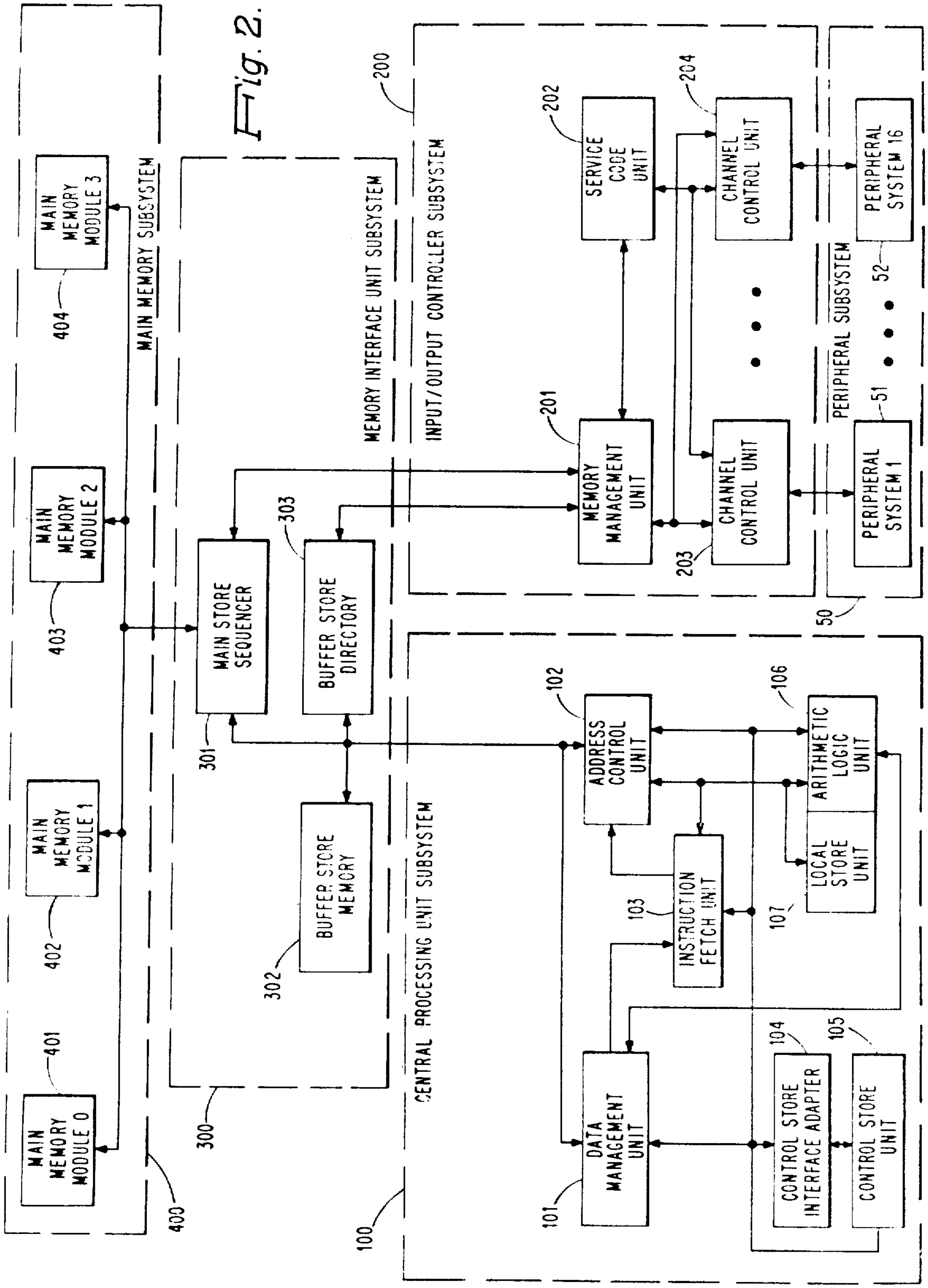
FIG. 2 is a block diagram of the major component circuits of the principal subsystems of a data processing unit.

Referring next to FIG. 2, important component units of the subsystems of the data processing unit are shown. The coupling between the various component units of the subsystem shown in FIG. 2 are representative and not comprehensive as will be apparent to one skilled in the art. The component units of the Peripheral Subsystem 50, however, are not included because they are not necessary for understanding the present invention. The IOC 200 is comprised of a Memory Management Unit 201, a Service Code Unit 202, and a series of Channel Control Units of which two, Channel Control Unit 203 and Channel Control Unit 204, are shown. In the preferred embodiment, any number of Channel Control Units up to 16, can be present. Each Channel Control Unit provides an interface between the component peripheral units of the Peripheral Subsystems 50 and the Memory Management Unit 201 and Service Code Unit 202. The Channel Control Units buffer data to and from the component peripheral unit of the Peripheral Subsystem 50 and stores information concerning the status of the peripheral channel.

The Main Memory Subsystem 400 is comprised of a group of four Main Memory Modules (401, 402, 403 and 404) in the preferred embodiment. These Main Memory Modules may be operated in various modes, such as an interleaved mode. The Main Memory Modules provide the apparatus for storage of the data necessary for the execution of the current processing tasks of the data processing unit.

The CPU 100 is comprised of a Data Management Unit 101, an Instruction Fetch Unit 103, an Address Control Unit 102, a Local Store Unit 107, an Arithmetic Logic Unit 106, a Control Store Interface Adapter 104, and a Control Store Unit 105. The operations of the CPU are controlled by Control Store 105. The Control Store 105 is loaded, in the preferred embodiment, by a control store load unit external to the CPU 100. The Control Store Interface Adapter 104 contains the logic necessary for directing the Control Store 105, such as address modification, address generation testing, etc. The Arithmetic Logic Unit 106 is comprised of the apparatus for performing the primary arithmetic operations and data manipulations required of the CPU. The Local Store Unit 107 is comprised of a small memory and associated logic apparatus and is used to store CPU control information and as a temporary storage of operands and partial results during the data manipulation. The Address Control Unit 102 includes apparatus for address development in the CPU. The Instruction Fetch Unit 103 contains apparatus for keeping the CPU supplied with instructions and attempts to have the next instruction available before completion of the present instruction. The Data Management Unit 101 provides an interface between CPU and the Buffer Store Directory 303 and/or the Buffer Store Memory 302. The apparatus of the Data Management Unit 101 determines which portion of the memory of the data processing unit contains the information to be retrieved and transfers the information into the CPU at the proper time.

The Memory Interface Unit 300 is comprised of a Buffer Store Memory 302, a Buffer Store Directory 303, and a Main Store Sequencer 301. The Buffer Store Memory 302 provides a small memory storage area for data that will receive a high percentage of usage in a given time. The Buffer Store Directory 303 contains apparatus for establishing if a given portion of data is contained in the Buffer Store Memory 302. The Main Store Sequencer 301 provides an interface between the modules of the Main Memory Subsystem 300 and the IOC 200 or CPU 100.

Figure 3:
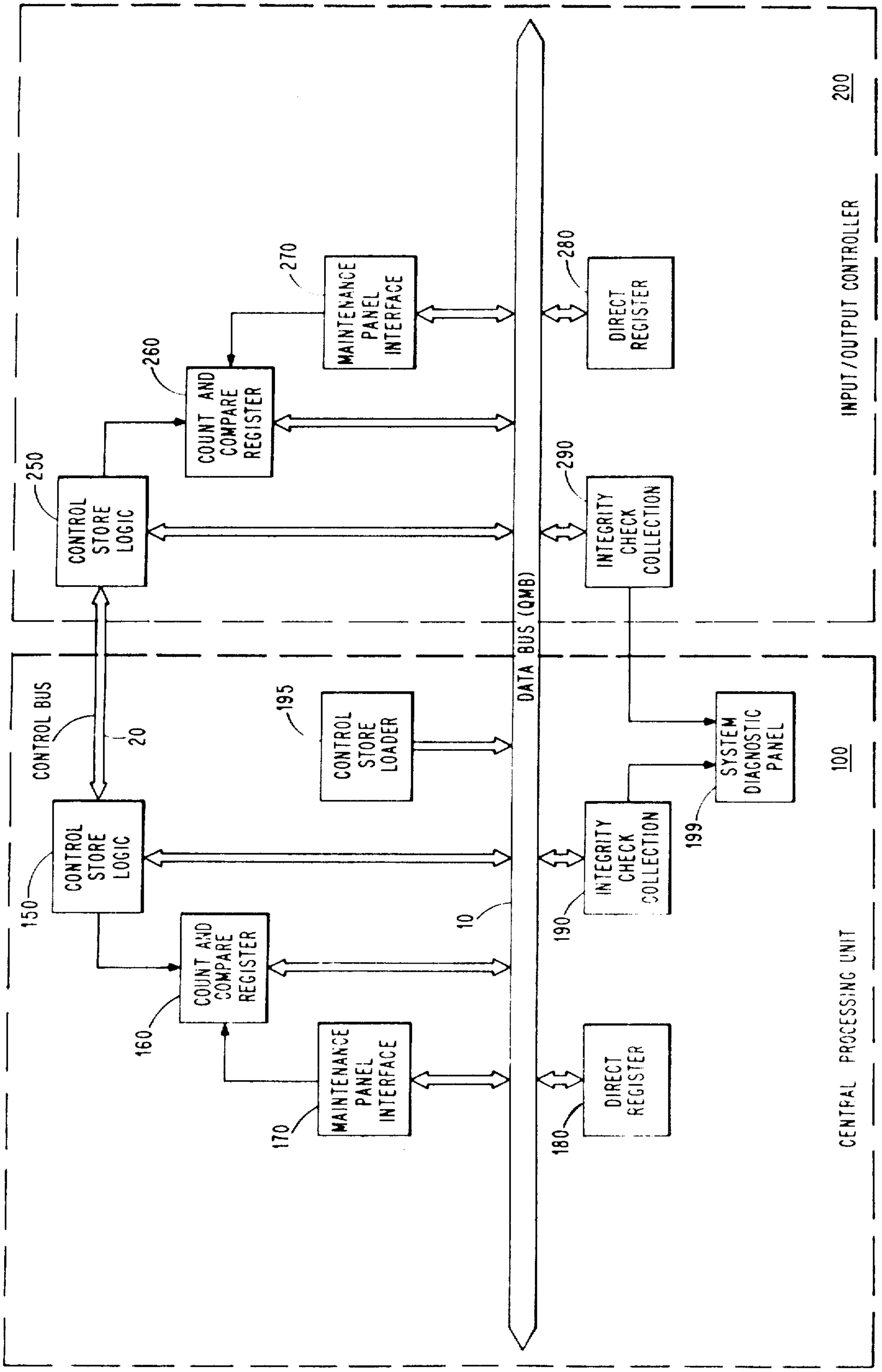
FIG. 3 is a block diagram of the apparatus used in diagnostic and verification procedures.

Referring next to FIG. 3, a block diagram is shown of apparatus associated with the data processing unit and used in diagnostic and verification procedures. The diagnostic and verification apparatus has portions of the apparatus in both the Central Processing Unit 100 and the Input/Output Controller 200. A Control Bus 20 and a Data Bus 10 couple the apparatus in the IOC with the apparatus located in the CPU. Control Bus 20, in the preferred embodiment, is comprised of two Control Data Buses. One Control Data Bus carries data from the CPU to the IOC while the second Control Data Bus carries data from the IOC to the CPU. Data Bus 10 provides a coupling between the diagnostic and verification apparatus located in the Central Processing Unit and similar apparatus located in the Input/Output Controller. The Data Bus 10 is used to exchange data between these two subsystems of the data processing unit. A System Diagnostic Panel 199 is coupled to both the Central Processing Unit 100 and the Input/Output Controller 200. In the preferred embodiment, this apparatus is located in the Central Processing Unit.

The diagnostic apparatus in the CPU 100 comprises Control Store Logic apparatus 150, Count and Compare Register 160, Maintenance Panel Interface 170, Control Store Loader 195, Diagnostic Direct Register 180, and Integrity Check Collection apparatus 190. The Diagnostic Direct Register 180 is a register, AC, of the CPU in the preferred embodiment. This Register is chosen because it is in the main data stream of the CPU as well as being one of the CPU's main adder operand registers. This register is coupled to Data Bus 10 and provides the IOC with direct access to a register in the CPU, thus providing a main interprocessor transfer path for systematic exchange of information. The Integrity Check Collection apparatus 190 includes apparatus for detecting fault conditions and for processing fault-condition information. Integrity Check Collection apparatus 190 is coupled to Data Bus 10 providing the IOC with access to the signals identifying the fault conditions generated in the CPU.

Control Store Loader 195 contains a diagnostic and verification program to be stored in a Control Store Memory portion of the Control Store Logic 150 or in the Control Store Logic 250 of the IOC. The Control Store Loader is coupled to Data Bus 10. Control Store Logic 150 comprises the apparatus for generating (diagnostic) commands in response to the commands stored in the memory portion of the Control Store Logic. In addition, instructions from the IOC via Control Bus 20 can cause a subcommand generator of Control Store Logic 150 to issue commands manipulating apparatus in the CPU. The Control Store Logic 150 is coupled to the Data Bus 10 and is also coupled to Control Bus 20. Count and Compare Register 160 includes the apparatus for performing certain tests during the sequencing of the instructions by the Control Store Logic. Count and Compare Register 160 is coupled to Data Bus 10 and is also coupled to Control Store Logic 150. Maintenance Panel Interface 170 contains apparatus for allowing instructions and commands to be entered into the Central Processing Unit manually. Maintenance Panel Interface 170 is coupled to Data Bus 10 and is coupled to Count and Compare Register 160.

In the IOC, Diagnostic Direct Register 280 is labelled the SYR Register. This register is chosen because it is in the main data processing stream of the IOC and is one of the main adder operand registers of the IOC. (In the preferred embodiment, a buffer stage is used because of the difference in data formats between the IOC and the CPU. The use of a buffer stage in such an application is well known in the art.) The Diagnostic Direct Register 280 provides the main interprocessor transfer paths for systematic exchange of data and is coupled to Data Bus 10. Integrity Check Collection 290 is the apparatus for detecting error and processing fault condition information in apparatus associated with the Input/Output Controller 200. Integrity Check Collection 290 is coupled to Data Bus 10 and to the System Diagnostic Panel 190. The Control Store Logic 250 provides the apparatus for storing a program supplied by Control Store Loader 195 via Data Bus 10 and for issuing a sequence of instructions based on that program. In addition, instructions from the CPU via Control Bus 20 can cause a subcommand generator of Control Store Logic 250 to issue commands manipulating apparatus in the IOC. The Control Store Logic 250 is coupled to Data Bus 10 and Control Bus 20. The Count and Compare Register 260 comprises apparatus for control in the sequence of instructions from the Control Store Logic 250. The Count and Compare Register 260 is coupled to Control Store Logic 250 and to Data Bus 10. The Maintenance Panel Interface 270 provides apparatus for manually entering data (instructions) into the data processing unit. The Maintenance Panel Interface 270 is coupled to Count and Compare Register 260 and to Data Bus 10. Integrity Check Collection 190 of the CPU 100 and Integrity Check Collection 290 of IOC 200 are coupled to the System Diagnostics Panel 199. The System Diagnostics Panel includes apparatus for displaying the results of detection and processing of fault condition information. This panel also provides a plurality of switches by which the mode of operation of the data processing unit may be controlled manually.

Figure 4:
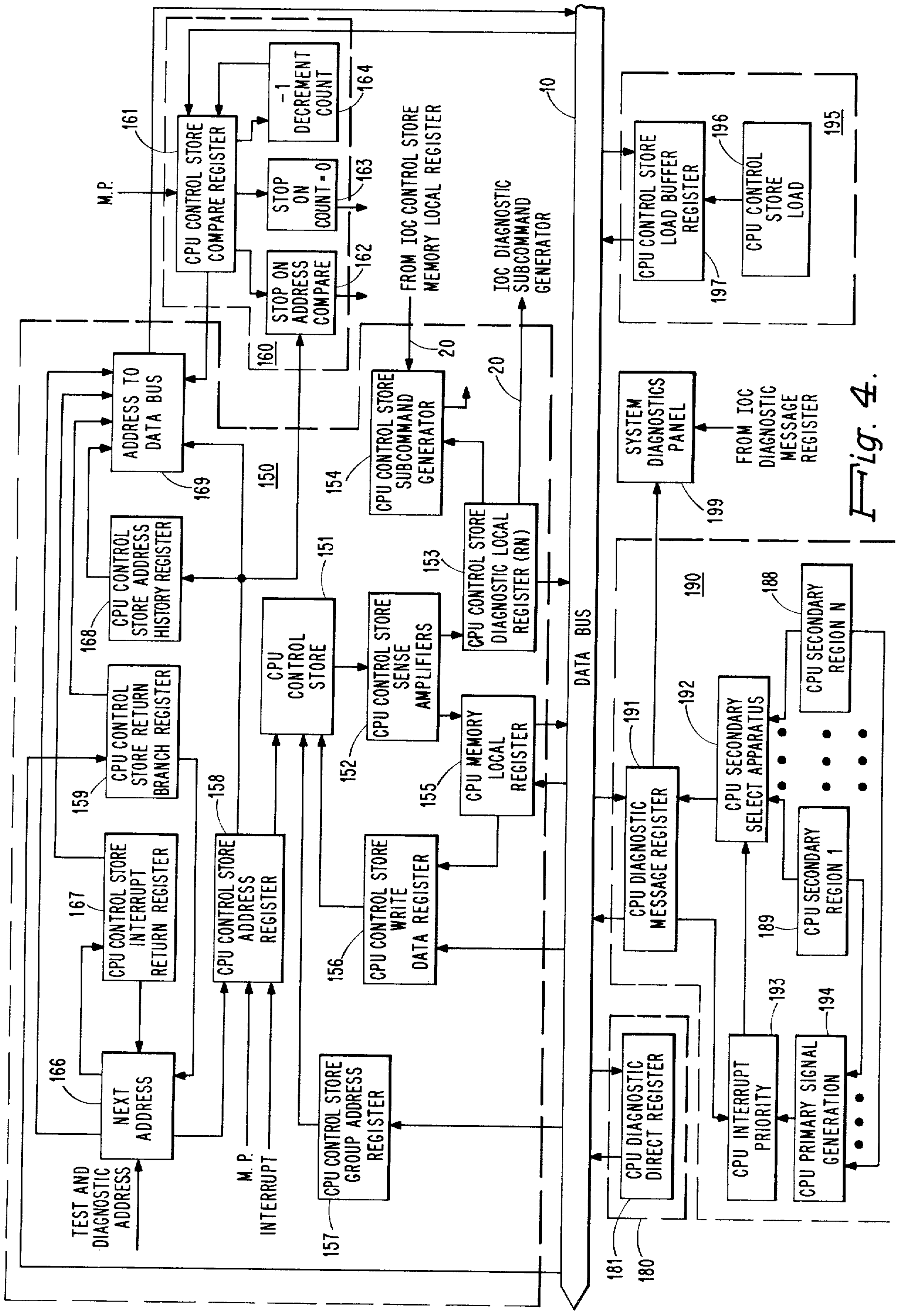
FIG. 4 is a block diagram of the circuits located in the Central Processing Unit subsystems which are used in diagnostic and verification procedures.

Referring next to FIG. 4, diagnostic apparatus in the Central Processing Unit is shown. Control Store Loader 195 is comprised of a CPU Control Store Load 196 and a CPU Control Store Load Buffer Register 197. The CPU Control Store Load is the unit containing the program for diagnostics and verification of the data processing unit. A cassette unit is used in the preferred embodiment. The Buffer Register 197 is needed in the preferred embodiment to ensure that the program is entered in the proper data format.

Integrity Check Collection 190 is comprised of a CPU Diagnostic Message Register 191, CPU Secondary Select Apparatus 192, a CPU Interrupt Priority 193 and a CPU Primary Signal Generation apparatus 194. The Central Processing Unit is divided up into N regions. Associated with each region is apparatus labeled CPU Secondary Region 1, 189 through CPU Secondary Region N, 188 in FIG. 4, which detects and generates groups of data signals identifying the location of a fault condition occurring in the region associated with the Secondary Region 1-N networks.

The Diagnostic Direct Register 180 is the AC Register 181 of the Central Processing Unit, described previously.

The Count and Compare Register 160 (and in the IOC Register 260) is a register which can be used for three special control functions. Its first use is a countdown register which can be loaded with a value and decremented one with each clock pulse. A synchronization pulse is developed at the clock time when the count reaches zero, which can be used for test sequence control. In addition, this register has a comparator associated with it which has the contents of the Control Store Address Register as its other input. Thus, a synchronization pulse can be generated when the program reaches a preloaded address. Finally, this register is the maintenance panel parameter entry path for extended procedures. The Count and Compare Register 160 is comprised of a CPU Control Store Compare Register 161, − 1 Decrement Count apparatus 164, Stop On Count Equal Zero apparatus 163, and Stop On Address Compare 162. The CPU Control Store Compare Register 161 can be loaded from the Data Bus 10.

The Control Store Logic 150 is comprised of the CPU Control Store 151, a CPU Control Store Subcommand Generator 154, a CPU Memory Local Register 155, a CPU Control Store Diagnostic Local Register (RN) 153, a CPU Control Store Address Register 158, a CPU Control Store Write Data Register 156, a CPU Control Store Group Address Register 157, an Address to Data Bus (Multiplexer) 169, a Next Address apparatus 166, a CPU Control Store Interrupt Return Register 167, a CPU Control Store Return Branch Register 159, and a CPU Control Store Address History Register 168. In the preferred embodiment, the CPU Control Store 151 has a buffering stage of CPU Control Store Sense Amplifiers 152. The contents of the CPU Control Store 151 are loaded from the Data Bus 10 through the CPU Control Store Write Data Register 156 at an address determined by the CPU Control Store Group Address Register 157. The contents of the CPU Control Store Address Register 158 are determined by the Next Address apparatus 166, i.e. apparatus which determines the next address in the CPU Control Store. Next Address 166 is, in turn, to be controlled by CPU Control Store Interrupt Return Register 167 (i.e. storing the address at the time of the interrupt) or the CPU Control Store Return Branch 159 (i.e. storing the Control Store address at the time of the branch). The CPU Control Store Address History Register 168 provides a record of the previous address of the CPU Control Store Address Register 158. The contents of the CPU Control Store 151 can be entered into CPU Control Store Diagnostic Local Register (RN) 153. From there, the contents of the CPU Control Store can be delivered to Data Bus 10, to Control Bus 20, or to the CPU Control Store Subcommand Generator 154. The address found in Next Address apparatus 166 is determined by an address from the test and diagnostic procedures or from the contents of an associated register (eg. CPU Control Store Interrupt Return Register 167). The Control Store Address Register 158 can contain an address determined by an Interrupt sequence, an address loaded from the Maintenance Panel (M.P.) or the address in Next Address apparatus 166. An address loaded from the Maintenance Panel is also applied to the contents of CPU Control Store Compare Register 161.

The System Diagnostic Panel 199 is coupled to the CPU Diagnostic Message Register 191 and to the IOC Diagnostic Message Register 291.

Figure 5:
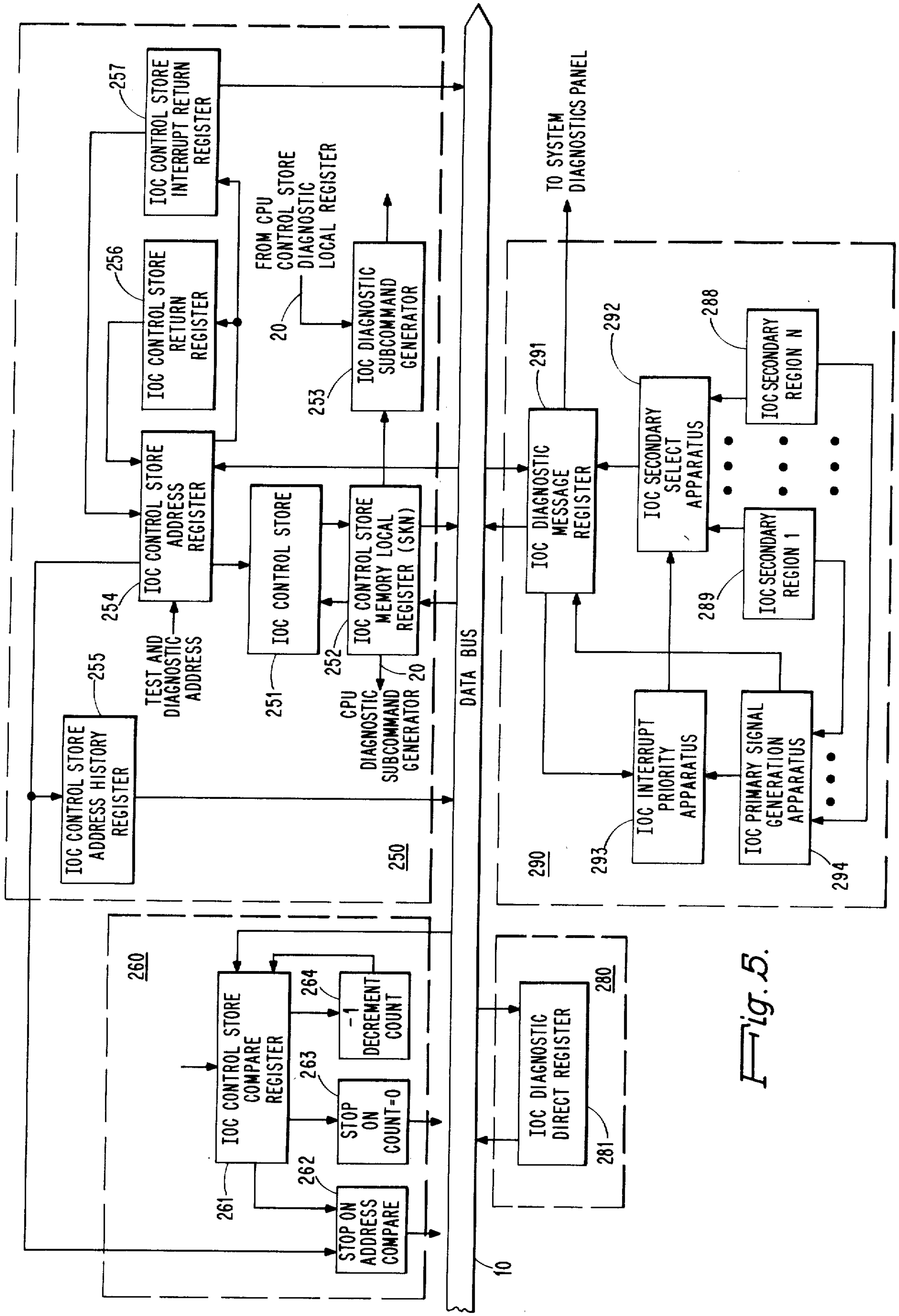
FIG. 5 is a block diagram of the circuits located in the Input/Output Controller subsystem which are used in diagnostic and verification procedures.

Referring next to FIG. 5, the portion of the diagnostic apparatus associated with the IOC 200 is shown. The Diagnostic Direct Register 280 is comprised of the IOC SYR Register 281, described above.

The Integrity Check Collection 290 is comprised of an IOC Diagnostic Message Register 291, an IOC Secondary Select Apparatus 292, an IOC Interrupt Priority Apparatus 293, an IOC Primary Signal Generation Apparatus 294, and a series of IOC Secondary Region 1289, through Secondary Region N 288 circuits. These circuits detect the presence of fault conditions and generate a series of signals identifying the nature and location of the fault condition. The IOC Diagnostic Message Register 291 is coupled to the System Diagnostic Panel 199 located, in the preferred embodiment, in the CPU. The IOC Diagnostic Message Register 291 is coupled to Data Bus 10.

The Count and Compare Register 260, described previously, is comprised of an IOC Control Store Compare Register, 261, Stop On Address Compare 262, Stop On Count Equal Zero 263, and − 1 Decrement Count 264.

The Control Store Logic 250 associated with the IOC is comprised of an IOC Control Store 251, an IOC Control Store Memory Local Register (SKN) 252, an IOC Diagnostic Subcommand Generator 253, an IOC Control Store Address History Register 255, an IOC Control Store Address Register 254, an IOC Control Store Return Register 256, and an IOC Control Store Interrupt Return Register 257. The IOC Control Store Memory Local Register 252 can be loaded and unloaded through the Data Bus 10 and the contents of the IOC Control Store Memory Local Register 252 can be applied to the IOC Diagnostic Subcommand Generator 253. The IOC Diagnostic Subcommand Generator is also coupled to Control Bus 20. The contents of the IOC Control Store 251 can be loaded from or unloaded into the IOC Control Store Memory Local Register 252 at an address determined by the IOC Control Store Address Register 254. The IOC Control Store Address Register 254 is determined by a test and diagnostic address, the contents of the IOC Control Store Return Register 256, or the IOC Control Store Interrupt Return Register (i.e. the address at the time of the process interrupt) 257. The previous address utilized by the IOC Control Store Address Register 254 is kept in the IOC Control Store Address History Register 255.

Referring next to FIG. *6a*, *6b*, and *6c*, configurations of the diagnostic apparatus for using one portion of the data processing unit to control the actions in the second portion of the data processing unit is shown. Referring first to FIG. *6a*, a typical configuration of the diagnostic apparatus for having a portion of the data processing unit verify its internal operation is shown. A portion of the contents of Control Store 151 is placed into the CPU Control Store Diagnostic Local Register RN 153. The contents of Register RN 153 are applied to the CPU Diagnostic Subcommand Generator 154. The output of the Diagnostic Subcommand Generator is comprised of subcommands causing activity in the Central Processing Unit 100. Similarly, the IOC Control Store 251 has a portion of its contents placed in the IOC Control Store Memory Local Register 252. The contents of the IOC Memory Local Register 252 are then applied to the Diagnostic Subcommand Generator 253 which, in turn, issues subcommands causing activities in the Input/Output Controller Unit 200.

Figure 6A:
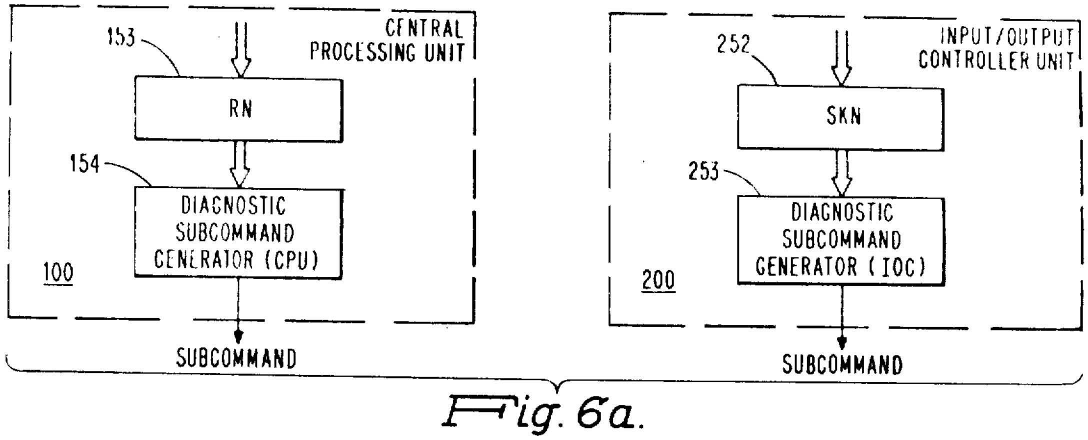
FIG. 6*a* is a block diagram showing the logic apparatus necessary for a control apparatus in one subsystem to manipulate apparatus within that subsystem.
Figure 6B:
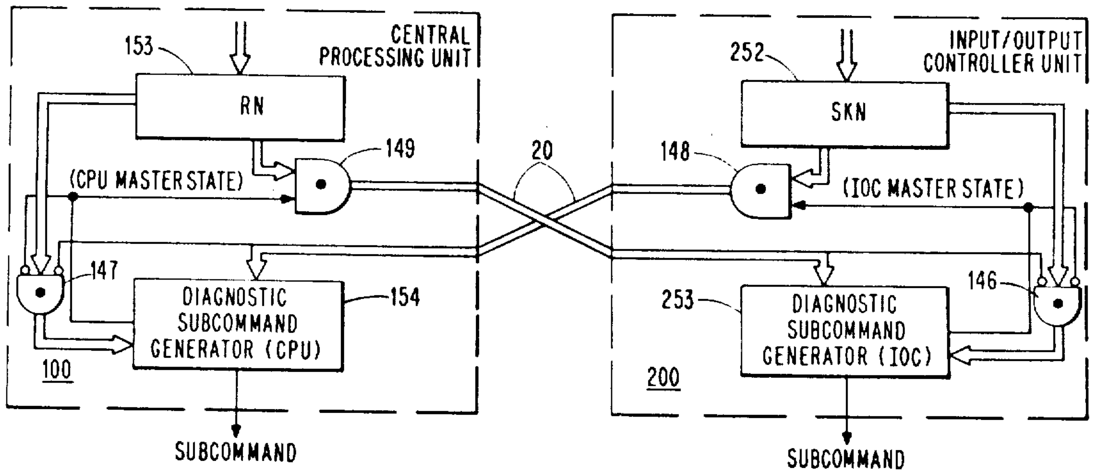
FIG. 6*b* is a block diagram showing the logic apparatus necessary for a control apparatus in one subsystem to manipulate apparatus in the other subsystem.

Referring next to FIG. 6b, the configuration for allowing one portion of the data processing unit to control the actions of a second portion of the data processing unit, according to the preferred embodiments, is shown. When the Central Processing Unit 100 is in control (i.e. the CPU is in the master state), a subcommand signal from the Diagnostic Subcommand Generator 154 activates logic AND gate 149. When logic AND gate 149 is activated, the contents of the CPU Control Store Diagnostic Local Register 153 are applied to Control Bus 20 which, in turn, applied the signals to the Diagnostic Subcommand Generator 253. Thus, signals from CPU Control Store 151 causes subcommands to be generated in the Input/Output Controller Unit 200. The subcommand cause the apparatus in the IOC to be manipulated in a predetermined manner, i.e. by the diagnostics and verification program. When the CPU 100 is in the master state, manipulation of the IOC apparatus by instructions of the IOC Control Store via Register SKN 252 can be required in the preferred embodiment. The access to the IOC Diagnostic Subcommand Generator 253 from Register SKN is through (Symbolic) logic AND gate 146. Logic AND gate 146 is enabled by the absence of an IOC Master State signal from Generator 253 and by the absence of signals from the Register RN 153 via Control Bus 20.

Similarly, when the IOC 200 is controlling the activity of the CPU (the IOC is in the master state), a subcommand signal from the Diagnostic Subcommand Generator 253 is applied to logic AND gate 148. The activation of logic AND gate 148 allows the contents of the IOC Store Memory Local Register 252 to be applied to Control Bus 20. The data signals of Control Bus 20 are applied to the CPU Diagnostic Subcommand Generator 154 which generates subcommands in the CPU 100. These CPU subcommands are generated in response to signals from the IOC Control Store 251, but activate the apparatus of the CPU in a predetermined manner. When the IOC 200 is in the master state, manipulation of the CPU apparatus by the instructions of the CPU Control Store via Register RN 153 can be required. The access to the Diagnostic Subcommand Generator 154 from Register RN is through (symbolic) logic AND gate 147. Logic AND gate 147 is enabled by the absence of a CPU Master State signal from Generator 154 and by the absence of signals from Register SKN via Control Bus 20.

Figure 6C:
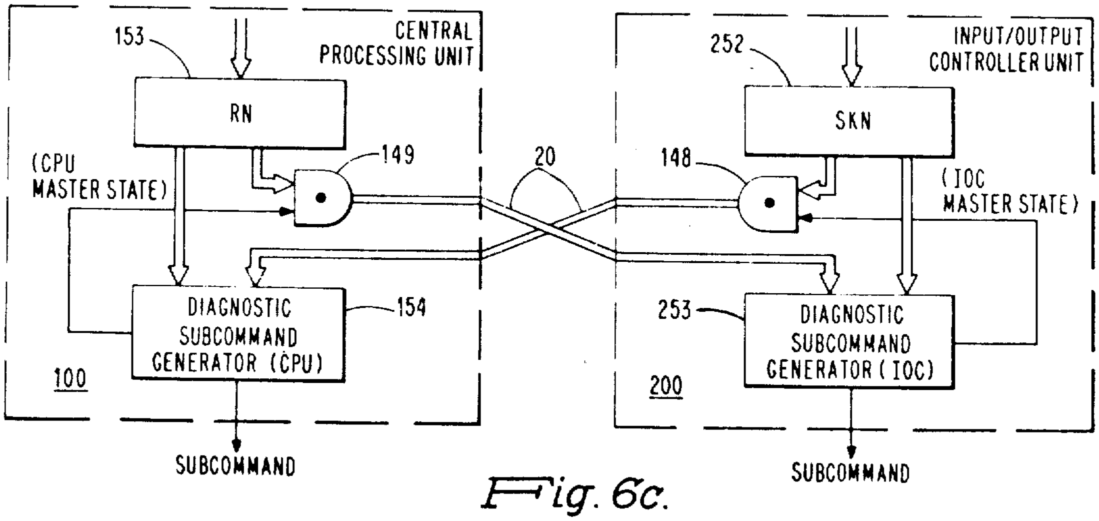
FIG. 6*c* is a diagram showing the logic apparatus necessary for a control apparatus in one subsystem to manipulate simultaneously the apparatus in two subsystems.

Referring next to FIG. 6c, the configuration for allowing a subsystem, in the master state, to exercise both the master subsystem and simultaneously exercise the slave subsystem is shown. In this case, the Diagnostic Subcommand Generator 154 applies a subcommand signal activating the logic AND gate 149. Thus, the commands from the CPU Control Store 151 which are loaded into the CPU Control Store Diagnostic Local Register 153 can be applied directly to the Diagnostic Subcommand Generator 154 as well as through the logic AND gate 149 to Control Bus 20 and consequently, to the IOC Diagnostic Subcommand Generator 253. Similarly, when the IOC is in the master state, a subcommand signal from the Diagnostic Subcommand Generator 253 activates logic AND gate 148. Commands from the IOC Control Store 251 entered into the IOC Control Store Memory Local Register 252 can be applied to the IOC Diagnostic Subcommand Generator 253 as well as through the logic AND gate 148 to control bus 20 and, consequently, to the CPU Diagnostic Subcommand Generator 154, thereby generating Diagnostic Subcommands in the CPU 100.

Operation of the Preferred Embodiment

In order to verify the integrity of operation or to diagnose the origin of an error condition in a data processing unit, two control centers for controlling the operation of two subsystems are employed. Use is made of the control apparatus of the Central Processing Unit and the control apparatus of the Input/Output Controller. (In the preferred embodiment, the control apparatus of the IOC is associated with the Service Code Unit and is functionally used, aside from the diagnostic and verification procedures, to handle service code requests from Channel Control Units, execute certain command codes and handle IOC error reporting.) With two centers of control, the apparatus of a first control center can be used to manipulate the apparatus of the subsystem associated with the second control center. Furthermore, the control apparatus of the first center is available for providing an appropriate response to the results provided by the second center as a result of its manipulation. Thus, if an error condition can be localized to the extent that the error did not occur in a subsystem having a control center, that control center can be used to identify the fault condition producing the error condition. Because the fault condition is isolated from the analysing apparatus, the problems arising from the uncertainty caused by processing with faulty apparatus are eliminated.

In the preferred embodiment, the control centers are provided with a Control Store memory for storing a set of instructing, a Subcommand Generator for translation of the instructions from the Control Store into signals manipulating the apparatus required for instruction execution, a Count and Compare Register for providing a portion of the control of the instruction sequencing of the Control Store, and associated apparatus for entering data into the Control Store, extracting data from the Control Store and for addressing the appropriate position of the Control Store. A Control Store Loader provides a stored program, which is entered in the appropriate Control Store during the diagnostic and verification procedures. The stored program could take the form of a microdiagnostic program, such as those of ordinary skill in the art could readily set forth as described in Chapters 2 and 3, *Microprogramming: Principles and Practices* by Samir S. Husson, published by Prentice-Hall, Inc., 1970.

In addition, apparatus is provided in both subsystems for the identification of an error condition. This function is performed by Integrity Check Collection apparatus. This apparatus identifies an error condition (e.g. such as when generated and transmitted parity check signals do not agree), and transfers the available information concerning location and nature of the error condition to a Diagnostic Message Register. Simultaneously, a primary signal is generated upon the detection of an error condition, which is used by the control apparatus to make a response appropriate to the status of the data processing unit. This primary signal can be masked (prevented from affecting the sequence of the diagnostic program) under specified circumstances.

In the preferred embodiment, the Diagnostic Direct Register, associated with principal data processing apparatus, provides an access to the signal manipulative portion of the data processing unit. This access can be used to examine results of signal processing to a manner different than the detection of an error provided by the Integrity Check Collection Apparatus, and to place data (e.g. error-containing data) into an intermediate portion of a signal processing operation. Such an imposition of data can be used to localize the operation resulting in the generation of an error condition.

Provision is also made for manual introduction of data signals into the diagnostics and verification process. This introduction is performed via a Maintenance Panel Interface. The Maintenance Panel Interface allows for increased flexibility in the manipulation of the subsystem than is possible with a pre-selected series of operations.

The independence of the two control centers requires that the results of a manipulation in one subsystem be available to the other subsystem. Further, it is frequently desirable to load a data group into the apparatus of the second subsystem from the first subsystem. To provide this two way data transfer path, a Data Bus is provided whose principal function, in the preferred embodiment, is to provide a transfer path for diagnostic and verification data between the first and the second subsystem. In Table 1, the apparatus of the CPU and IOC subsystems which are coupled to the Data Bus are displayed, and the direction of data transfer is shown. For example, as indicated previously, the Diagnostic Direct Registers of the IOC and CPU can have data entered or extracted by the control apparatus of the other subsystem depending on the operation desired in the diagnostic and verification procedure.

The preferred embodiment contemplates three modes of operation of the control centers of the two subsystems. The first mode of operation is the normal operation of a subsystem's control center, in which instructions are extracted from the Control Store under control of the addressing circuits, and applied to the Subcommand Generator of the subsystem. In the diagnostic and verification procedures, this mode of operation is used for self-verification of a limited amount of control center apparatus. Typically, the self-verification is performed for both subsystems in an effort to establish a general location of the fault condition. Localization of a detected fault condition can, however, be frustrated by the presence of the fault condition. The second mode of operation occurs when a first control center, in a master state, controls the activity of a second subsystem, in a slave state. In the preferred embodiment, instructions from the Control Store of the control center in the master state are applied to the Subcommand Generator of the subsystem in the slave state. This transfer of instructions occurs over the Control Bus 20 of the present invention, which consists of two data transfer buses between the Control Store Memory Local Register of one subsystem with the Subcommand Generator of the other subsystem. If the instruction formats of the two subsystems are different, buffering between the two subsystems can be required as will be apparent to one skilled in the art. In the preferred embodiment, the Subcommand Generator of the slave subsystem can also receive orders from the associated control store when the master subsystem is not supplying instructions to the slave Subcommand Generator. The third mode of operation of the two control centers involves the extraction of instructions from the Control Store of the subsystem in the master state for application to both the master state Subcommand Generator and the slave state Subcommand Generator. This mode of operation is employed for diagnosing parts of the data processing unit that involve both the IOC and the CPU. In the preferred embodiment, this mode of operation employs the CPU as the master, the CPU containing the more powerful and flexible control apparatus.

The CPU and IOC diagnostic subcommand generators are used to control diagnostic actions such as; bus transfers, clocking, control store cycling, integrity check collection and control of various diagnostic states and modes. The actions generated are divided into two categories: internal and external. Internal actions are those diagnostic actions, both control and data transfer, that a subsystem can perform within itself without direct effect upon the other subsystem. External actions are those diagnostic actions, both control and data transfer, that one unit can force the other subsystem to perform. There are some diagnostic actions that can be generated both interally and externally. The generation of external actions is limited to the subsystem controlling the diagnostic process at any given point in the process. This controlling subsystem is in master state. The diagnostic process is designed to prevent more than one unit being in master state with its clocking on at any given time.

The use of the independent Integrity Check Collection apparatus for the two subsystems simplifies another aspect of the diagnostic problem. The identification of an error condition arising in one subsystem causes control of the diagnostic procedure to be placed with the subsystem for which an error condition has not been detected. Moreover, the response of the data processing unit to an error condition detected in the master state subsystem is different from the response to an error detected in the slave state subsystem. It is therefore expedient to separate the error detection and collection apparatus associated with the two subsystems.

In the preferred embodiment, a System Diagnostics Panel is employed which displays the information available from either of the Diagnostic Memory Registers. In addition, this Panel contains manual switches for establishing the operational mode of the data processing unit, (i.e. Normal mode, diagnostic mode, etc.).

The basis of orderly progress in the master subsystem-slave subsystem testing is the inter-subsystem control of clocking. It permits test sequencing and test analysis in the Master subsystem to remain synchronized with the relatively shorter test application sequences in the slave subsystem. In particular, it permits the master subsystem to "freeze" the results of a test sequence in the slave subsystem until they can be observed and analyzed by the master subsystem program.

In the preferred embodiment, a single timing source drives clocking systems in the CPU, the IOC, and the Buffer Store portions of the Memory Interface Unit (MIU). The Main Storage Sequencer (MSS) portion of the MIU and each of the four Main Memory Subsystems modules have independent, asynchronous timing sources.

Within the units (CPU, IOC, Buffer Store) supplied by the common timing source, there are several timing distribution systems, called clocking systems. The CPU and IOC each have three: the clocking associated with the control store cycling, called control store clocking; the clocking associated with functional subcommand execution, called system clocking; and the clocking associated with error signal propagation and diagnostic subcommand generation, called free-running clocking. Both control store clocking and system clocking are capable of being stopped, started, or stepped under hardware and firmware control. The free-running clocking is active at any time that the timing source is operational. Clocking within the Buffer Store is, in this sense, part of the free-running system.

A number of states are defined for the central subsystem to reflect the status of the system and control store clocking networks. The subsystem states (Halt, Idle, Wait) describe the activity of the subsystem as a whole (that is, whether clocking is ON in the Master Unit, in both Master and Slave units, or in neither) at the time of diagnostic process termination. Subsystem Unit states (Run, Load, Scan) reflect which clocks are active in a particular unit at any moment of the diagnostic process. The three clock-related process termination states are defined as follows: Halt State, the clocking in both CPU and IOC is stopped; Idle State, the clocking in the Master Unit is running, and both system and control store clocking in the Slave Unit is stopped; and Wait State, all central subsystem clocking is running. In either subsystem, both clocks can be running, both can be stopped, or the control store clocking can be running while the system clocking is stopped. When both clocks are operating, the subsystem unit is said to be in the run state; this is the normal, functional condition of both the CPU and the IOC. There are two states in which the control store clocking is ON and the system clocking is OFF: Load and Scan. The Load state has two purposes: functional use is to provide for the loading of writable control store; and additional diagnostic use is to permit master subsystem control over the slave subsystem's control store addressing mechanism. For example, the master subsystem could cause a change in the sequence of control store locations being accessed by the slave subsystem which is equivalent to a control store branch. The Scan state purpose is the automatic verification of the contents of control store. In Scan state, each location of control store is retrieved in sequence and checked for parity, and no non-diagnostic external intervention is possible until the scan process has run to completion. A Stop state is defined as both control store and system clocking being disabled. The master subsystem can place the slave subsystem unit in this state.

The CPU and IOC differ in their actual implementation of system clocking control in the preferred embodiment. In the IOC, only one physical clocking system exists, and the condition of system-clocking-OFF/control store-clocking-ON is achieved by inhibition of subcommand generator output. However, for purposes of description, the CPU and IOC have an equivalent set of states.

During the conduct of a diagnostic program, circumstances can occur where control of a subsystem's clocks must be exercised. For example, the detection of a hardware fault during some portion of the diagnostic program is of such a nature that this portion can be brought to an orderly conclusion. In these cases clock control is by firmware control, and always involves control of the slave subsystem's clocking. As a further example, the fault can require immediate disabling of clocking, of either master or slave, so that the fault symptoms are not destroyed by subsequent hardware activity.

Hardware features permit automatic stopping of the clocking of a unit within which an unmasked primary error has occurred, depending on which of two mutually exclusive diagnostic Modes is effective in the unit at the time of the error. The two modes are Diagnostic Normal Mode and Diagnostic Interrupt Mode. While in Diagnostic Normal Mode, if an unmasked primary error occurs within either unit (master or slave), the results are a transition to the Diagnostic Interrupt Mode and an activation of the interrupt features of the normal control store sequencing logic. If the unit is in the Diagnostic Interrupt Mode at the time of the unmasked primary error, subsequent events depend on whether the subsystem is master or slave. The effect on the slave subsystem is to stop both its control store and system clocking. If the subsystem is master, the result is, in addition to the stopping of its clocks, the raising of a special control function line called the CPU (or IOC) Master Error Abort Function. When this function is raised the master unit is shifted out of the Master State. The other unit can become master and continue the diagnostic process, depending on the circumstances.

In addition to detection of an unmasked primary error condition, another feature is its ability to stop a subsystem's clocks. This is done via a stop sync pulse output from the Count and Compare Register. This condition can be used by the subsystem in master state to prevent the subsystem in the slave state from uncontrolled looping during the execution of test sequences.

Several diagnostic subcommands exist for control of the Slave Unit's clocking via firmware. A Set Load State command stops the slave's system clocking, but leave the control store clocking On; Reset Load State command starts the slave's system clocking when its control store clocking is already running. A command Start Clock starts all of the slave's clocking systems that are allowed by the subsystem state.

The command Stop Clock stops both clocking systems in the slave subsystem. The command Stop Clock steps whichever of the slave subsystem's clocks are not running and are allowed by the Unit State. The effect of Start Clock is equal to Step when a valid stop condition exists.

The above description is included to illustrate the operation of the preferred embodiment and is not meant to limit the scope of the claims. The scope of the invention is to be limited only by the following claims. From the above discussion, many variations will be apparent to one skilled in the art that would yet be encompassed by the spirit and scope of the invention.

TABLE 1

| SUBSYSTEM | REGISTER NAME | LOADABLE | UNLOADABLE |
|---|---|---|---|
| CPU | Control Store Address Register | x | x |
| | Control Store History Register | | x |
| | Control Store Return Branch Register | x | x |
| | Control Store Interrupt Return Register | | x |
| | Control Store Compare Register | x | x |
| | Control Store Next Address Generation | | x |
| | Control Store Function Local Register | x | x |
| | Control Store Diagnostic Local Register | | x |
| | Control Store Group Address Register | x | |
| | Control Store Write Data Register | x | |
| | Diagnostic Direct Register | x | x |
| | Diagnostic Message Register | x | x |
| | Control Store Local Buffer Register | x | x |
| IOC | Control Store Address Register | x | |
| | Control Store Address History Register | | x |
| | Control Store Interrupt Return Register | | x |
| | Control Store Compare Register | x | x |
| | Control Store Memory Local Register | x | x |
| | Diagnostic Direct Register | x | x |
| | Diagnostic Message Register | x | x |

What is claimed is:

1. In combination with a data processing unit having at least two subsystems, apparatus for controlling the operation of a one of said two subsystems by another of said two subsystems, including:

a first control store circuit included within a first subsystem comprising, a first control store memory for storing a first group of signals, a first control circuit coupled to said first control store memory for controlling storage and extraction of said first group of signals, and a first subcommand generator for controlling operation of said first subsystem in response to said first group of signals;

a second control store circuit included within a second subsystem comprising, a second control store memory for storing a second group of signals, a second control store circuit coupled to said first control store memory for controlling storage and extraction of said second group of signals, and a second subcommand generator for controlling operation of said second subsystem in response to said second group of signals;

first means coupling said first control store memory and said second subcommand generator, said first group of signals applied to said second subcommand generator in response to a first command signal for controlling operation of said second subsystem; and second means coupling said second control store memory and said first subcommand generator, said second group of signals applied to said first subcommand generator in response to a second command signal for controlling operation of said first subsystem.

2. The apparatus of claim 1 further including:

a maintenance interface unit coupled to said first and said second control store circuits for manually controlling operation of said first and said second subsystem.

3. In combination with a data processing unit having at least two subsystems, apparatus for verifying the operation of and for localizing errors in said data processing unit comprising:

a data bus for transmitting electrical signals;

a first control store network included within a first subsystem for controlling the operation of said first subsystem, said first control store network coupled to said data bus;

a second control store network included within a second subsystem for controlling the operation of said second subsystem, said second control store network coupled to said data bus;

a control bus for transmitting command and control signals coupled to said first and said second control store networks, said first control store network controlling said second subsystem in response to a first command signal, said second control store network controlling said first subsystem in response to a second command signal;

a first integrity check network for identification of error conditions in said first subsystem, said first integrity check network coupled to said data bus;

a second integrity check network for identification of error conditions in said second subsystem, said second integrity network coupled to said data bus; and a plurality of registers coupled to said data bus, said registers receiving signals from and applying signals to said first and said second control store networks in response to appropriate control signals, said plurality of registers locating a fault condition in response to operation of said first and said second subsystems under control of said first and said second control store networks.

4. The apparatus of claim 3 further including a maintenance interface unit coupled to said first and said second control store networks for manually entering data into said first and said second control store networks.

5. The apparatus of claim 4 further including a diagnostic display panel coupled to said first and said second integrity check network for identifying a malfunctioning unit causing a detected error condition.

6. In combination with a data processing unit having at least two subsystems apparatus, for verifying the operation of and for localizing errors in said data processing unit, comprising:

a first control circuit included within a first subsystem, for controlling the operation of said first subsystem;

a second control circuit included within a second subsystem, for controlling the operation of said second subsystem;

means for coupling said second control circuit and said first control circuit, said second control circuit controlling the operation of said first subsystem in response to a first command signal, said first control circuit controlling the operation of said second subsystem in response to a second command signal;

first means for detection of a result of the operation of said first subsystem;

second means for detection of a result of the operation of said second subsystem; and a data bus coupled to said first control circuit, said second control circuit, said first detection means and said second detection means, said data bus exchanging data signals between said control circuits and said first and said second detection means.

7. The apparatus of claim 6 further including a direct register associated with said first and said second subsystem, each of said direct registers coupled to said data bus, said direct register being a main adder operand register, said register providing a main transfer of data between said first and said second subsystems.

8. The apparatus of claim 7 further including means for manually entering data into said first and said second control circuit.

9. The apparatus of claim 8 further including a diagnostic display panel coupled to said first and said detection means, said diagnostic display panel identifying a malfunctioning unit when said results of the operation of said first and said second subsystem is an error condition.

* * * * *